US009583782B2

United States Patent
Huang et al.

(10) Patent No.: US 9,583,782 B2
(45) Date of Patent: Feb. 28, 2017

(54) BATTERY AND MANUFACTURE METHOD THEREOF

(71) Applicants: Nung-Te Huang, Taipei (TW); Yu-Cheng Shen, Taipei (TW)

(72) Inventors: Nung-Te Huang, Taipei (TW); Yu-Cheng Shen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 727 days.

(21) Appl. No.: 13/944,898

(22) Filed: Jul. 18, 2013

(65) Prior Publication Data

US 2014/0045014 A1 Feb. 13, 2014

(30) Foreign Application Priority Data

Aug. 9, 2012 (CN) .......................... 2012 1 0282861

(51) Int. Cl.
| H01M 10/04 | (2006.01) |
| H01M 10/0587 | (2010.01) |
| H01M 2/10 | (2006.01) |
| H01M 2/02 | (2006.01) |

(52) U.S. Cl.
CPC ..... *H01M 10/0431* (2013.01); *H01M 2/1027* (2013.01); *H01M 10/0587* (2013.01); *H01M 2002/0205* (2013.01); *Y10T 29/49108* (2015.01)

(58) Field of Classification Search
CPC ........... H01M 10/0431; H01M 2/1027; H01M 10/0587; H01M 2002/0205
See application file for complete search history.

(56) References Cited

U.S. PATENT DOCUMENTS

| 6,224,995 B1 * | 5/2001 | Fauteux | H01M 4/0442 |
| | | | 29/623.1 |
| 6,689,511 B2 * | 2/2004 | Yamada | H01M 2/1066 |
| | | | 429/163 |
| 2008/0137890 A1 * | 6/2008 | Petersen | H01M 4/66 |
| | | | 381/323 |
| 2011/0183183 A1 * | 7/2011 | Grady | H01M 2/1022 |
| | | | 429/152 |
| 2012/0015223 A1 * | 1/2012 | Bhardwaj | H01M 2/1027 |
| | | | 429/94 |
| 2013/0288093 A1 * | 10/2013 | Nakagiri | H01M 2/0207 |
| | | | 429/94 |

FOREIGN PATENT DOCUMENTS

| CN | 1801505 | * | 7/2006 | ............ H01M 10/04 |
| CN | 101212069 | | 7/2008 | |
| JP | 10-270069 | * | 10/1998 | ............ H01M 10/04 |
| KR | 2003-0066960 | * | 8/2003 | ............ H01M 10/12 |
| TW | 529190 | | 4/2003 | |
| WO | WO 2012/117473 | * | 9/2012 | ........ H01M 10/0587 |

* cited by examiner

*Primary Examiner* — Ula C Ruddock
*Assistant Examiner* — Amanda Barrow
(74) *Attorney, Agent, or Firm* — Jianq Chyun IP Office

(57) ABSTRACT

A battery includes a casing and a plurality of cell coils. The casing includes a bottom and a top, the bottom or the top surface of the casing are not symmetrical with each other and the multiple cell coils are placed in the casing and are electrically connected to each other. Each of the cell coils includes a positive node, a negative node and an insulation sheet, and the insulation sheet is between the positive node and the negative node. An outer diameter of the cell coil changes along with the shape of the casing. A manufacture method of a battery is provided.

9 Claims, 7 Drawing Sheets

BATTERY AND MANUFACTURE METHOD THEREOF

CROSS-REFERENCE TO RELATED APPLICATION

This application claims the priority benefit of CN application serial No. 201210282861.4, filed on Aug. 9, 2012. The entirety of the above-mentioned patent application is hereby incorporated by reference herein and made a part of specification.

BACKGROUND OF THE INVENTION

Field of the Invention

The invention relates to a battery and a manufacturing method thereof and, more particularly, to a battery and a manufacturing method thereof which can configure cells according to accommodating space.

Description of the Related Art

Since a primary battery is not environmentally friendly, a rechargeable battery system becomes more and more important recently.

Portable electronic products, such as a digital camera, a mobile phone and a notebook computer, need a light battery. As the portable electronic products develop rapidly and are used widely, a lithium battery, which can be charged repeatedly, provides a high voltage, has a high power density and is light, is in great need. The lithium battery includes polymer electrolyte as non-hydrogen electrolyte and has good anti-leakage and high security. Moreover, the lithium battery including the polymer electrolyte is light and thin, which can be designed to fit the shape and the size of various electronic devices.

BRIEF SUMMARY OF THE INVENTION

A battery with a plurality of cell coils appropriate for inner space or shape of a casing is provided.

A manufacturing method of a battery which configures cell coils corresponding to inner space or shape of a casing to optimize an inner structure of the battery is also provided.

A battery includes a casing and a plurality of cell coils. The casing includes a bottom surface and a top surface, wherein the bottom or the top surface of the casing are not symmetrical with each other. The multiple cell coils are placed in the casing and are electrically connected to each other. Each of the cell coils includes a positive node, a negative node and an insulation sheet, and the insulation sheet is between the positive node and the negative node. An outer diameter of the cell coil changes along with the shape of the casing.

A manufacturing method of the battery includes following steps: providing a casing with an accommodating space and required power of the electronic device; overlapping and winding a positive node, a negative node and an insulation sheet to form a cell coil; and configuring the cell coil in the casing to make an outer diameter of the cell coil appropriate for the shape of the casing wherein, the bottom surface and the top surface of the casing are not symmetrical with each other.

These and other features, aspects and advantages of the present invention will become better understood with regard to the following description, appended claims, and accompanying drawings.

DETAILED DESCRIPTION OF THE EMBODIMENTS

Figure 1:
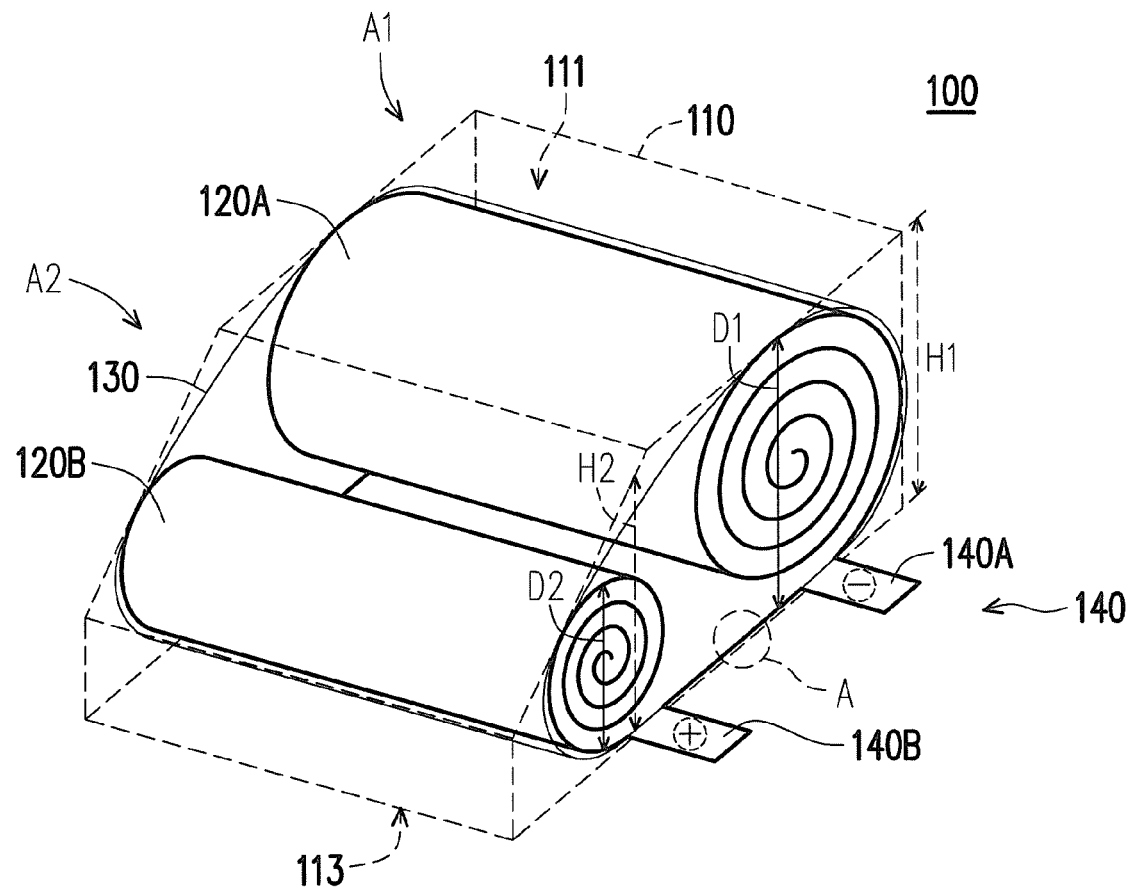
FIG. 1 is a schematic diagram showing a battery in a first embodiment.
Figure 2A:
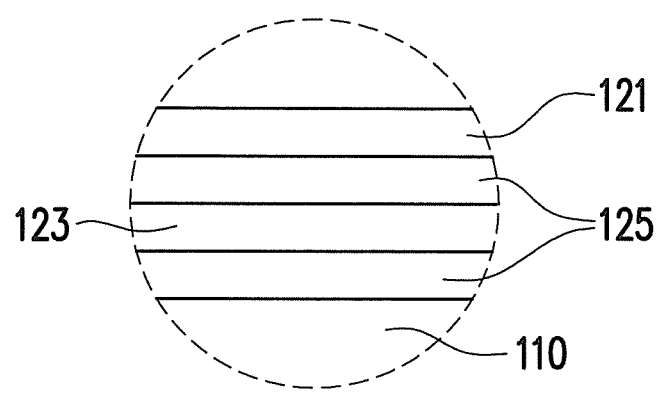
FIG. 2A is a partial enlarged view showing a cell coil in FIG. 1.

FIG. 1 is a schematic diagram showing a battery in a first embodiment. FIG. 2A is a partial enlarged view showing a cell coil in FIG. 1. FIG. 3 is a side view showing the battery in FIG. 1. Please refer to FIG. 1 to FIG. 3, the battery 100 may be a lithium polymer battery assembled in an electronic device (not shown), such as a notebook computer. In the embodiment, the battery 100 includes a casing 110, two cell coils 120A and 120B and a covering layer 130. In order to show the cell coils 120A, 120B and the covering layer 130 more clearly, the covering layer 130 is shown in a thinner line, and a distance exists between the covering layer 130 and the cell coils 120A, 120B. Actually, the covering layer 130 is adjacent to the cell coils 120A and 120B.

The casing 110 is detachably assembled to the electronic device, and the cell coils 120A and 120B are placed in the casing 110 and electrically connected to each other to provide power after the battery 100 is assembled to the electronic device. Each of the cell coils 120A and 120B includes a positive node 121, a negative node 123 and an insulation sheet 125. The two insulation sheets 125 are disposed between the positive node 121 and the negative node 123 and between the negative node 123 and the casing 110, respectively. After the cell coils 120A and 120B are wound, they are wrapped by the covering layer 130 (such as an aluminum foil) and placed in the casing 110. The casing of the battery has a top surface and a bottom surface. The bottom surface and the top surface of the casing are not symmetrical with each other.

Figure 2B:
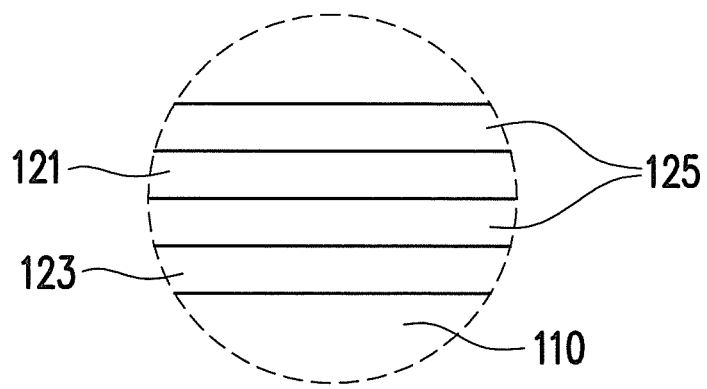
FIG. 2B is a partial enlarged view showing a cell coil in another embodiment.
Figure 3:
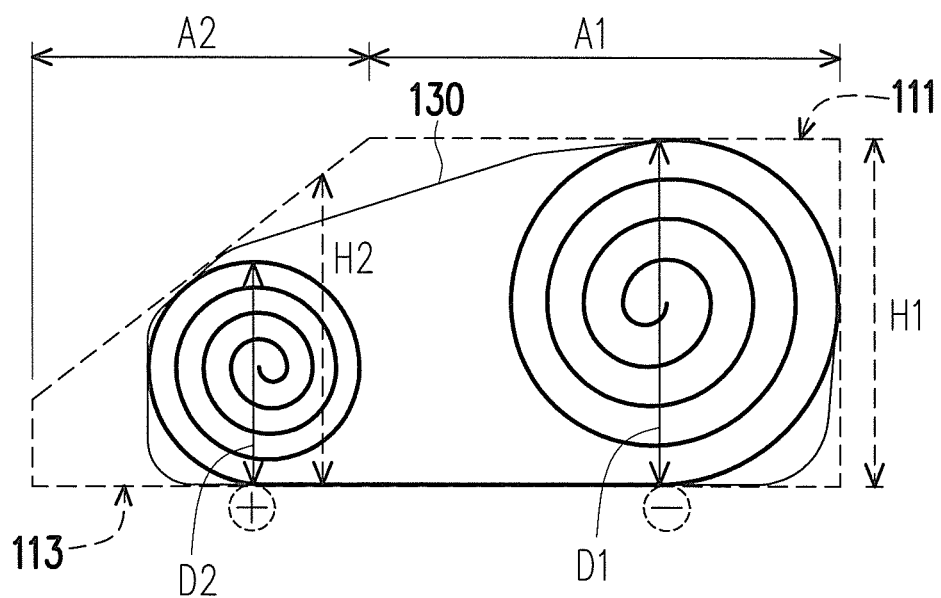
FIG. 3 is a side view showing the battery in FIG. 1.

FIG. 2B is a partial enlarged view showing a cell coil in another embodiment. The difference with the first embodiment is that one insulation sheet 125 is disposed between the positive node 121 and the negative node 123, and the other insulation sheet 125 is disposed at one side of the positive node 121 away from the negative node 123.

The casing 110 is made corresponding to the shape and the outline of the electronic device, and thus the size of the casing 110 is not fixed. In other words, the casing 110 includes a top 111 and a bottom 113, wherein the bottom surface and the top surface of the casing are not symmetrical with each other. The height of the top surface 113 and a height of the bottom surface changes along with the shape of the casing 110, which means the distance between the bottom 113 and the top 111 of the casing 110 is not fixed and corresponds to the shape and the outline of the electronic device.

For example, please refer to FIG. 1 and FIG. 3, the casing 110 is divided to a first area A1 and a second area A2. The first area A1 has a first height H1, the second area A2 is adjacent to the first area A1 and has a changeable second height H2. In the embodiment, the first height H1 is larger than the second height H2, and the second height H2 decreases progressively along a direction away from the first area A1.

Thus, when the cell coils 120A and 120B are disposed in the casing 110, the first height H1 and the second height H2 should be taken into account to use space more efficiently. If the power provided by the cell coils 120A and 120B equals to the power required by the electronic device, and the cell coils 120A and 120B are wound in a same winding density via a fixed winding process, the cell coil 120A is appropriate to be disposed in the first area A1, and the cell coil 120B is appropriate to be disposed in the second area A2. In other words, an outer diameter D1 of the cell coil 120A appropriate for the first area A1 should match with the first height H1, and an outer diameter D2 of the cell coil 120B appropriate for the second area A2 should match with the second height H2, which means the outer diameter D1 of the cell coil 120A is larger than the outer diameter D2 of the cell coil 120B, and the number of the winding layers of the cell coil 120A is larger than that of the cell coil 120B.

The cell coils 120A and 120B may have different outer diameters via different winding layers, and parameters (such as a winding speed) in the winding process of the cell coil may also be controlled to make the cell coils in different shapes.

Figure 4:
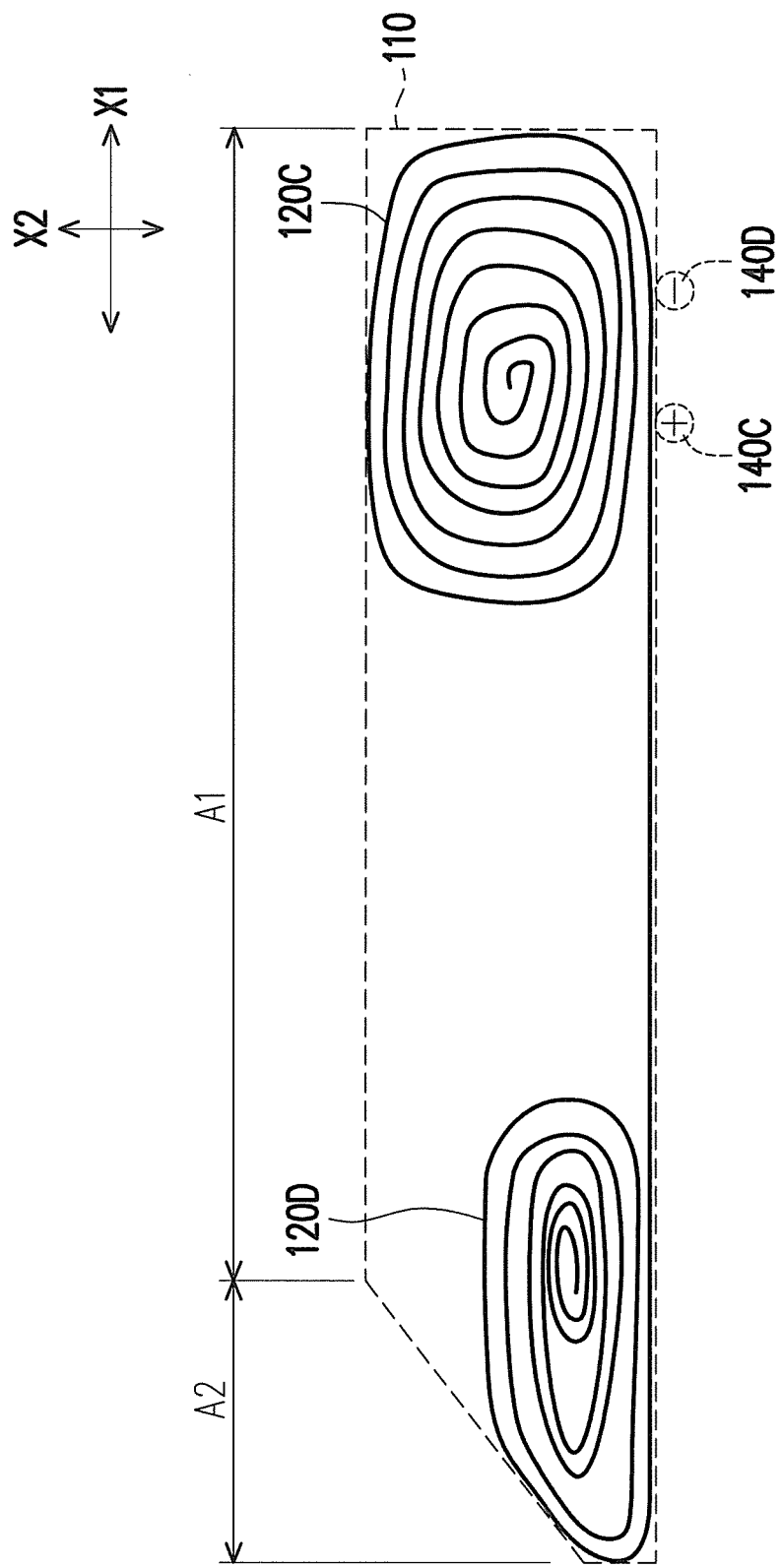
FIG. 4 is a schematic diagram showing a battery in a second embodiment.

FIG. 4 is a schematic diagram showing a battery in a second embodiment. Please refer to FIG. 4, in the embodiment, in order to make the cell coils 120C and 120D appropriate for the casing 110, a winding density of the cell coil 120C in the first area A1 along a horizontal direction X1 is smaller than that along an axial direction X2, and thus the cell coil 120C is in a rectangle shape, as shown in FIG. 4. In another embodiment, the winding density of the cell coil 120C along a horizontal direction X1 may be larger than that along an axial direction X2, which is based on the space in the casing 110 and not limited herein.

In order to make the cell coil 120D appropriate for the second area A2, a winding density of the cell coil 120D changes along a horizontal direction X1, as shown in FIG. 4, to make the cell coil 120D fit the wedge-shaped outline of the second area A2.

The number and the winding direction of the cell coils are not limited. Please refer to FIG. 1 and FIG. 3, the cell coils 120A and 120B are formed by overlapping and winding the same positive node 121, the same negative node 123 and the same insulation sheet 125, and they are wound in opposite directions.

Figure 5:
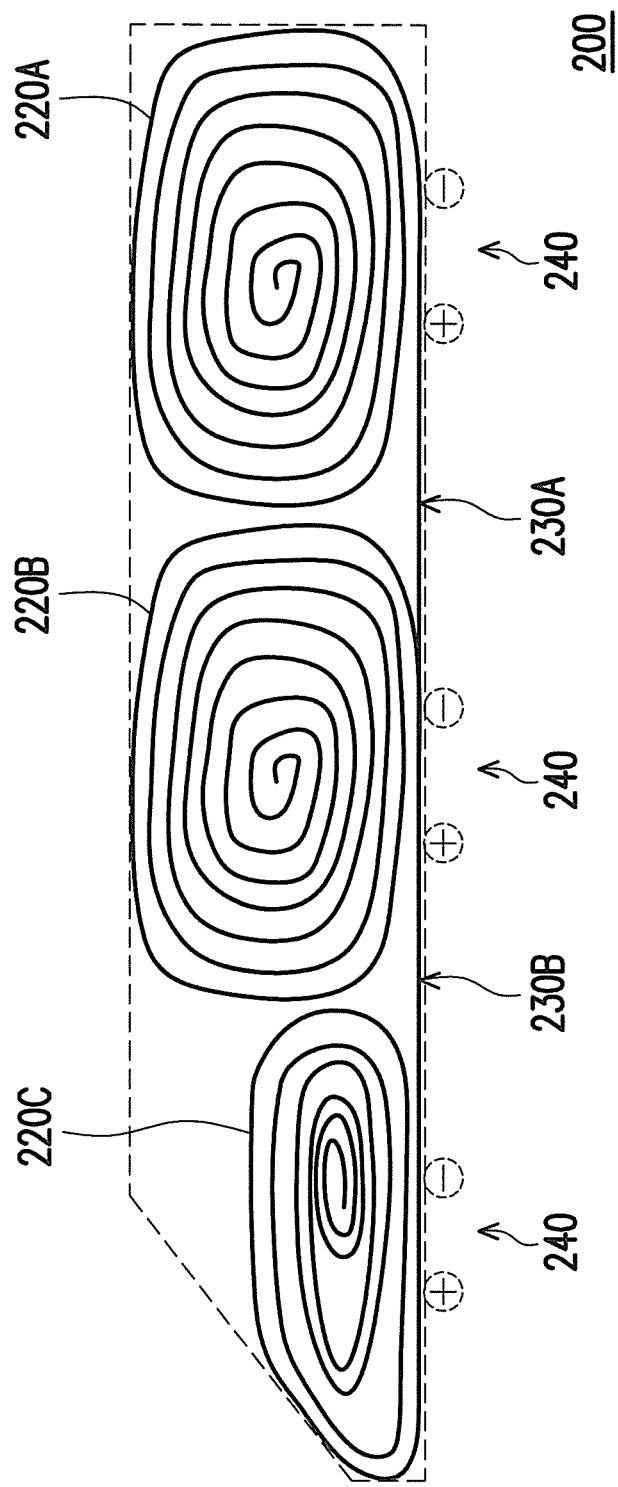
FIG. 5 is a schematic diagram showing a battery in a third embodiment.

FIG. 5 is a schematic diagram showing a battery in a third embodiment. Please refer to FIG. 5, in the embodiment, the battery 200 includes cell coils 220A, 220B and 220C, and the cell coils 220A, 220B and 220C are wound respectively and electrically connected to each other via connecting parts 230A and 230B.

Please refer to FIG. 1 and FIG. 3, in the embodiment, the battery 100 further includes a pair of electrical dipoles 140 (which include a positive outputting part 140B and a negative outputting part 140A). The positive outputting part 140B is electrically connected to the positive node 121, the negative outputting part 140A is electrically connected to the negative node 123, and they are used as power transmission ports between the battery 100 and the electronic device. Furthermore, the positive outputting part 140B is connected to the cell coil 120B, and the negative outputting part 140A is connected to the cell coil 120A.

The connecting between the electrode outputting parts and the cell coils is not limited herein. In the embodiment shown in FIG. 4, the positive outputting part 140C and the negative outputting part 140D are both connected to the cell coil 120C. In the embodiment shown in FIG. 5, the battery 200 includes multiple pairs of the electrical dipoles 240, and they are connected to the cell coils 220A, 220B and 220C, respectively. In another embodiment not shown, the multiple pairs of electrical dipoles may be connected to one cell coil.

As stated above, the electrical dipoles which are used as power transmission ports can be arranged according to requirements. For example, if a circuit board (not shown) connected to the battery has a limited structure or space, power inputting parts can only be disposed at two sides away from each other, and the battery shown in FIG. 1 is appropriate for the circuit board. In the embodiment shown in FIG. 5, the electrical dipoles 240 are connected to the cell coils 220A, 220B and 220C of the battery 200, respectively, which makes the battery 200 more adaptable.

As stated above, the cell coils and the electrical dipoles can be configured and arranged according to power and space requirements.

Figure 6:
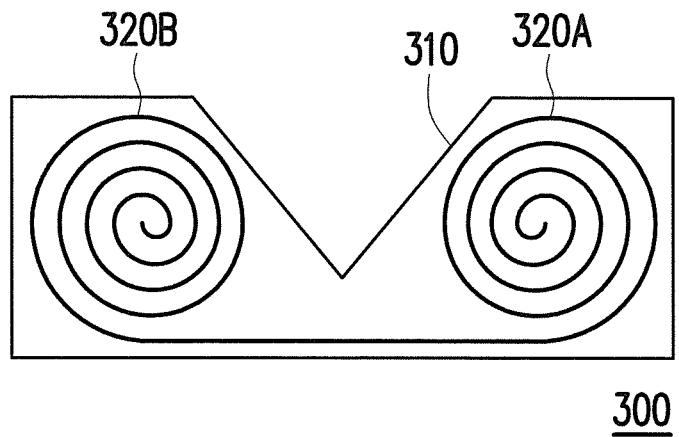
FIG. 6 and FIG. 7 are schematic diagrams showing a battery in a fourth embodiment and a fifth embodiment.
Figure 7:
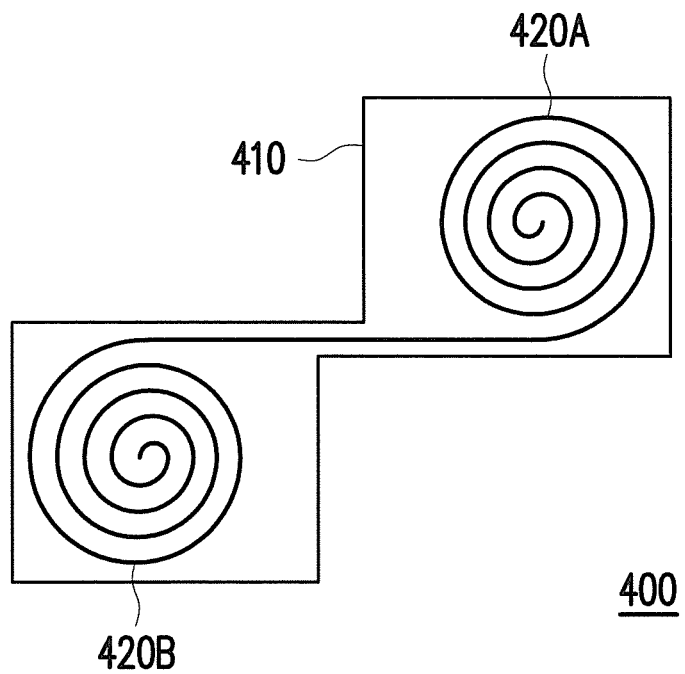

FIG. 6 and FIG. 7 are schematic diagrams showing a battery in a fourth embodiment and a fifth embodiment. Please refer to FIG. 6 and FIG. 7, respectively, as shown in FIG. 6, the two cell coils 320A and 320B of the battery 300 are disposed separately to adapt to the casing 310 which has a V-shaped groove. As shown in FIG. 7, the two cell coils 420A and 420B of the battery 400 are separated and disposed stagger to each other to adapt to the casing 410 which is in a stage shape.

Figure 8:
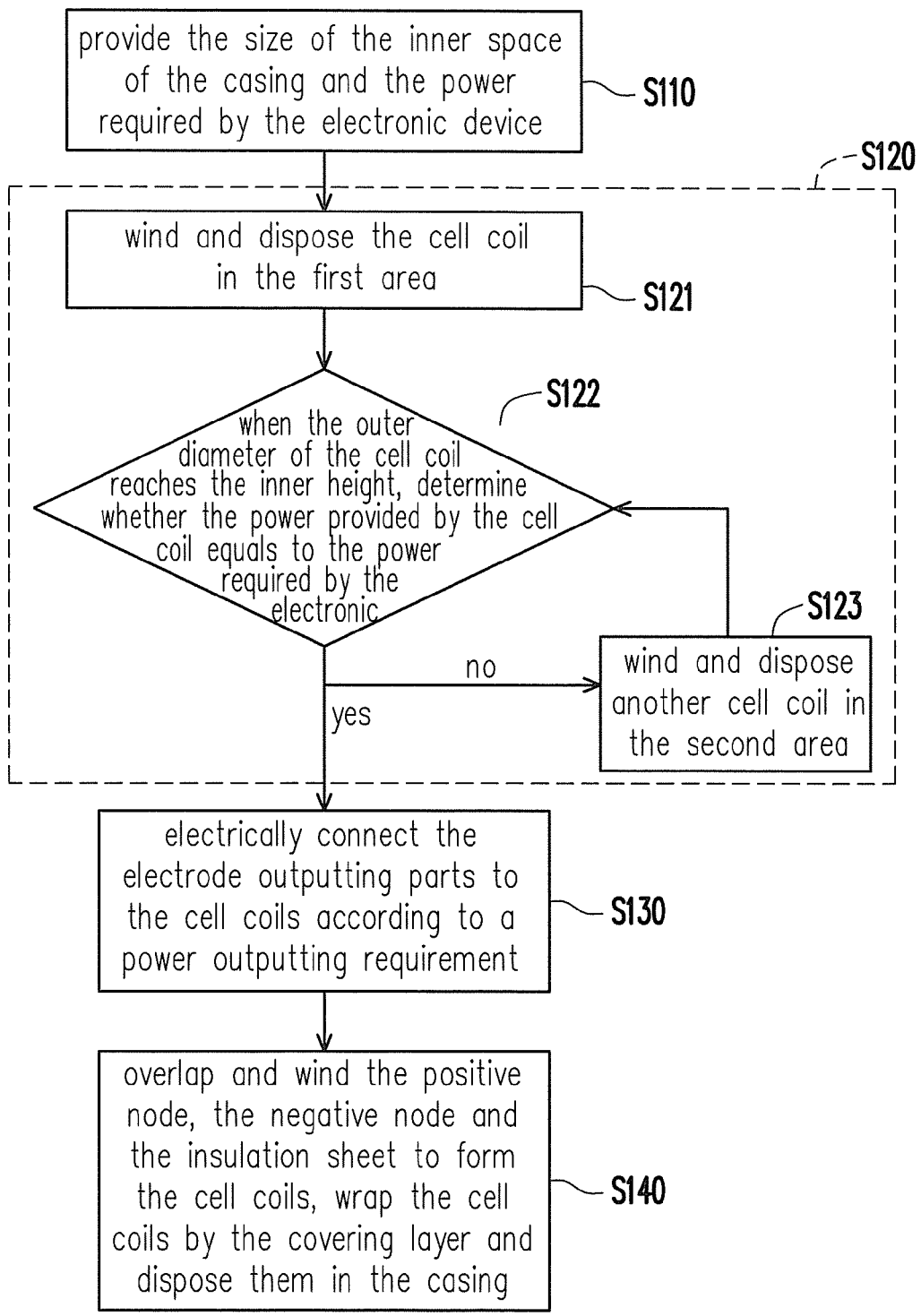
FIG. 8 is a flow chart showing a manufacturing method of a battery.

FIG. 8 is a flow chart showing a manufacturing method of a battery. Please refer to FIG. 8 and FIG. 2, in order to make the casing 110 and the cell coils meet the shape, structure and power requirements of the electronic device, the size of the inner space of the casing 110 and the power required by the electronic device are provided in step S110.

As shown in FIG. 2, in order to make the casing 110 appropriate for the electronic device, the casing 110 is divided to the first area A1 and the second area A2 according to the height. Thus, in step S120, the cell coils 120A and 120B are wound according to the inner space or shape of the casing 110 and the power required by the electronic device.

In step S130, the electrode outputting parts 140A and 140B are electrically connected to the cell coils 120A and 120B according to a power outputting requirement.

In step S140, the positive node 121, the negative node 123 and the insulation sheet 125 are overlapped according a predetermined result in the previous step, and they are wound to form the cell coils 120A and 120B. The cell coils 120A and 120B are wrapped by the covering layer 130 and disposed in the casing 110, and the battery 100 is finished.

In order to use the inner space of the casing 110 more effectively, the cell coils 120A and 120B are further configured in the step S120.

In step S121, the cell coil 120A is disposed in the first area A1. Then, in step S122, when the outer diameter D1 of the cell coil 120A reaches the first height H1 (which means the cell coil 120A is appropriate for the first height H1 of the first area A1), it is determined that whether the power provided by the cell coil 120A equals to the power required by the electronic device. If yes, the process is finished. If no, in step S123, another cell coil 120B is disposed in the second area A2. After the cell coil 120B in the second area A2 is wound, it is determined again that whether the power provided by the cell coils 120A and 120B equals to the power required by the electronic device. The steps of winding, configuring and determining are repeated to achieve a best configuring efficiency of the cell coils 120A and 120B and a best space utilization of the casing 110.

In sum, the outer diameter of the cell coil changes along with the shape of the casing to make the cell coil appropriate for the inner space of the casing and make the battery have a better space utilization. Before the cell coil is wound, the space in the casing and the power required by the electronic device are determined, and multiple cell coils are wound from a part with a larger height to a part with a smaller height, which makes the winding and configuring of the cell coils more efficient.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A battery, comprising:
    a casing including a bottom surface and a top surface, wherein the bottom surface and the top surface of the casing are not symmetrical with each other,
    wherein the casing is divided into at least a first area and a second area, a distance between the bottom surface and the top surface in the first area defines a first height, and the top surface is sloped relative to the bottom surface throughout the entire second area so that a distance between the bottom surface and the top surface in the second area decreases progressively along a direction away from the first area throughout the entire second area;
    a plurality of cell coils including a first cell coil and a second cell coil disposed in the casing and electrically connected to each other, wherein each of the cell coils includes at least a positive node, at least a negative node, and at least an insulation sheet,
    wherein the insulation sheet is between the positive node and the negative node;
    the first cell coil is disposed in the first area and the second cell coil is disposed in the second area;
    an outer diameter of the first cell coil corresponds with the first height, an outer diameter of the second cell coil corresponds with the distance between the bottom surface and the top surface in the second area;
    wherein the first cell coil and the second cell coil are wound with the same positive node, the same negative node and the same insulation sheet.

2. The battery according to claim 1, wherein the outer diameter of each of the cell coils increases with winding layers of the respective cell coil.

3. The battery according to claim 1, wherein a shape of a cross section of each of the cell coils is appropriate for an internal line of the casing.

4. The battery according to claim 1, wherein winding directions of at least the first cell coil and the second cell coil are opposite to each other.

5. The battery according to claim 1, wherein the battery further includes:
    at least a positive outputting part electrically connected to the positive node of the second cell coil; and
    at least a negative outputting part electrically connected to the negative node of the first cell coil.

6. The battery according to claim 1, wherein the battery further includes:
    at least a positive outputting part electrically connected to the positive node of one of the cell coils: and
    at least a negative outputting part electrically connected to the negative node of the same one of the cell coils.

7. A manufacturing method of a battery, wherein the battery is assembled to an electronic device, the manufacturing method of the battery comprising following steps:
    providing a casing with an accommodating space and required power of the electronic device;
    wherein the casing is divided into at least a first area and a second area, a distance between the bottom surface and the top surface in the first area defines a first height, and the top surface is sloped relative to the bottom surface throughout the entire second area so that a distance between the bottom surface and the top surface in the second area decreases progressively along a direction away from the first area throughout the entire second area,
    overlapping and winding a positive node, a negative node and an insulation sheet to form a plurality of cell coils including a first cell coil and a second cell coil, wherein the insulation sheet is between the positive node and the negative node, the first cell coil is disposed in the first area and the second cell coil is disposed in the second area; and
    configuring the plurality of cell coils in the casing to make an outer diameter of the first cell coil corresponding with the first height, an outer diameter of the second cell coil corresponding with the distance between the bottom surface and the top surface in the second area,
    wherein the first cell coil and the second cell coil are wound with the same positive node, the same negative node and the same insulation sheet.

8. The manufacturing method of the battery according to claim 7, wherein the manufacturing method of the battery further includes:
    determining whether the power provided by the first cell coil meets the required power of the electronic device when the outer diameter of the first cell coil in the first area appropriate for the first height of the casing; and
    configuring the second cell coil in the second area when the power provided by the first cell coil is less than the required power of the electronic device.

9. The manufacturing method of the battery according to claim 7, wherein the manufacturing method further includes:
    connecting at least a positive outputting part and at least a negative outputting part to the plurality of cell coils.

* * * * *